United States Patent [19]

McMahon

[11] Patent Number: 5,681,370
[45] Date of Patent: Oct. 28, 1997

[54] AIR DRYER SYSTEM

[76] Inventor: James P. McMahon, 615 Belknap, San Antonio, Tex. 78212

[21] Appl. No.: 560,465

[22] Filed: Nov. 17, 1995

[51] Int. Cl.⁶ .......................... B01D 53/04; B01D 53/26
[52] U.S. Cl. .................. 95/105; 95/106; 95/123; 95/125; 95/126; 96/126; 96/130; 96/133; 96/144; 96/146
[58] Field of Search ...................... 95/104–106, 117, 95/122–126; 96/108, 115, 126–130, 133, 144, 146

[56] References Cited

U.S. PATENT DOCUMENTS

| 1,819,498 | 8/1931 | Cole | 96/133 |
|---|---|---|---|
| 2,428,885 | 10/1947 | Luáces | 95/125 |
| 2,626,675 | 1/1953 | Maher | 96/144 |
| 2,739,664 | 3/1956 | Parks | 95/124 |
| 3,311,293 | 3/1967 | Moffatt | 230/209 |
| 4,321,069 | 3/1982 | Ritter | 96/130 X |
| 4,448,592 | 5/1984 | Linde | 96/130 X |
| 4,516,988 | 5/1985 | Winter | 96/127 X |
| 4,699,635 | 10/1987 | Norback | 95/122 X |
| 5,071,449 | 12/1991 | Sircar | 96/130 X |
| 5,092,135 | 3/1992 | Cameron | 96/130 X |

FOREIGN PATENT DOCUMENTS

| 61-007855 | 3/1986 | Japan | 95/117 |
|---|---|---|---|
| 63-107725 | 5/1988 | Japan | 95/125 |
| 0156896 | 11/1932 | Switzerland | 96/133 |
| 0841654 | 6/1981 | Switzerland | 95/122 |
| 2082082 | 3/1982 | United Kingdom | 96/130 |

*Primary Examiner*—Robert Spitzer
*Attorney, Agent, or Firm*—Akin, Gump, Strauss, Hauer & Feld, L.L.P.

[57] ABSTRACT

A regenerative desiccant air dryer system. Dry air is alternately drawn from approximately the center of two desiccant housings which are open at the top and bottom. A reclamation assembly directs dry air into the housing being purged to assist in the purging of moisture from the desiccant, and subsequently cooling the desiccant. The system is portable and operated by a programmable controller.

20 Claims, 8 Drawing Sheets

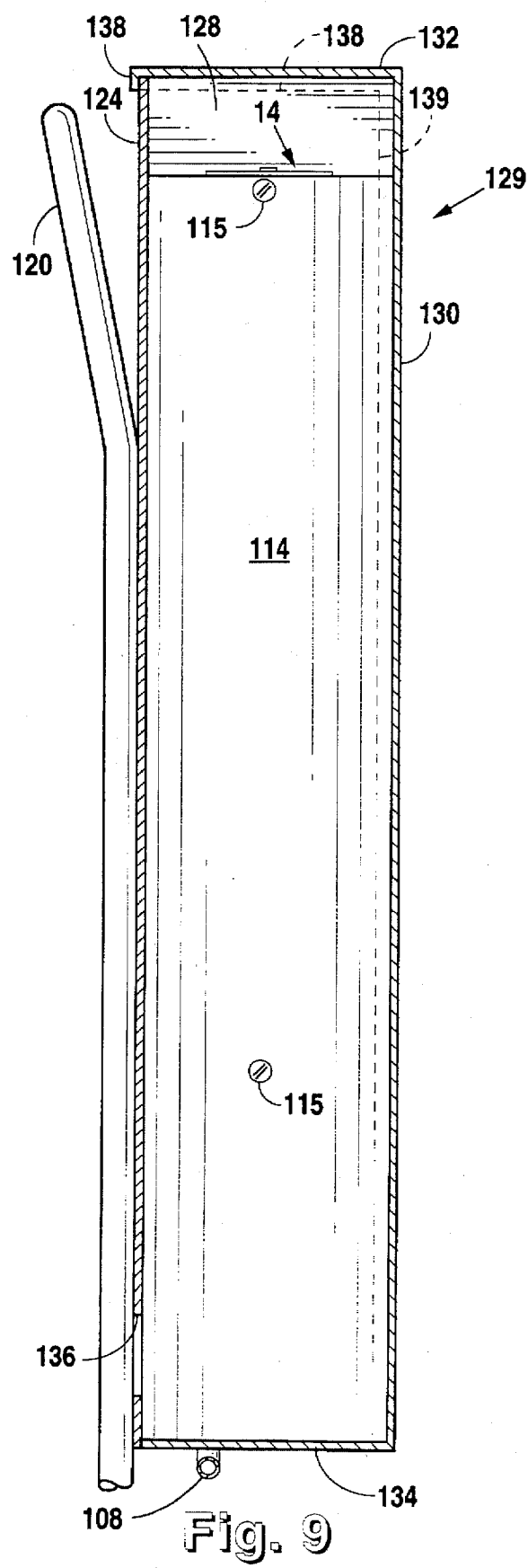

AIR DRYER SYSTEM

BACKGROUND OF THE INVENTION

The present invention relates to air dryers. More particularly, the present invention relates to a regenerative desiccant dryer system which utilizes low pressure and heat and which operates on the suction side of compressors or regenerative blowers.

Air dryers are typically classified according to their method of operation. The three most common classifications of air dryers are refrigerated dryers, deliquescent dryers, and desiccant dryers. In the desiccant dryer classification, air dryers are grouped as single shot or regenerative. The regenerative type air dryers may be heatless, utilizing a pressure swing or vacuum swing, or may utilize heat, having a rotating wheel, tray or cylinder, or utilizing high or low pressure.

Regenerative desiccant dryers utilizing heat and low pressure typically comprise a pair of cylindrical housings, each of which is connected by tubing to a three-way valve through which a suction is drawn. Each housing includes desiccant and heater elements and their respective suction tubing is connected to the bottom or base of the housing. Each housing is open at the top thereof, to permit fluid communication with the ambient air, and closed at the bottom thereof. The dryer cycles such that each housing is alternately in a drying mode, wherein ambient air is drawn from the top of the housing through the desiccant and out from the bottom of the housing through the suction tubing, or a heating mode wherein the heater elements convert the moisture absorbed by the desiccant into water vapor which passes outward from the top of the housing.

These prior types of regenerative desiccant dryers have several inherent deficiencies. For example, these prior dryers tend to develop moisture leaks from the bottom of the housings. Further, these types of dryers only evacuate moisture from the top of the housing, thereby impeding the ability of water vapor at the lower or closed end of the housing to escape and reducing the effectiveness and utilization of the desiccant. Finally, these prior dryers have long cycling times due to their limited ability to cool the desiccant.

SUMMARY OF THE INVENTION

Accordingly, the present invention provides a portable regenerative desiccant air dryer system in which the dry air is drawn from approximately the center of open ended desiccant housings. The system of the present invention includes a first desiccant portion, preferably contained in a first housing, a second desiccant portion, preferably contained in a second housing, and a manifold assembly and heating assembly located in each housing. The housings are open on each end thereof to permit fluid communication with the ambient air. The manifold assembly includes a receiver positioned in approximately the center of the housing having a cavity therein in fluid communication with a plurality of slits in the manifold tubes. An air moving assembly draws a suction on the manifold assembly and a reclamation assembly directs dry air to the housing being purged to assist in the purging of moist or humid air. The housings cycle between a DRY mode in which dry air is drawn from the housing and a PURGE mode in which the housing is purged of moisture and the desiccant is regenerated.

The process of the present invention comprises the steps of drawing dry air from approximately the center of a first desiccant portion while simultaneously purging a second desiccant portion. The system then reverses its cycle so that dry air is drawn from approximately the center of the second desiccant portion and the first desiccant portion is simultaneously purged, thereby providing a continuous source of dry air. The purging steps include the step of heating the respective desiccant portion for a predetermined time interval. The process further comprises the step of directing some of the dry air from the desiccant portion in the DRY mode into the desiccant portion in the PURGE mode.

The system of the present invention overcomes the limitations of prior regenerative desiccant dryers by utilizing open ended housings and drawing the dry air from approximately the middle of the housings. Such configuration prohibits the collection of moisture in the lower end of the housings and leakage resulting therefrom. The present invention further provides a forced cooling of the desiccant, thereby significantly reducing the cycling time between the PURGE and DRY modes.

BRIEF DESCRIPTION OF THE DRAWINGS

FIG. 9 is a cross sectional view taken along section lines 9—9 of FIG. 1 illustrating the ease in the preferred embodiment of the air dryer system of the present invention.

DETAILED DESCRIPTION OF THE PREFERRED EMBODIMENTS

Figure 1:
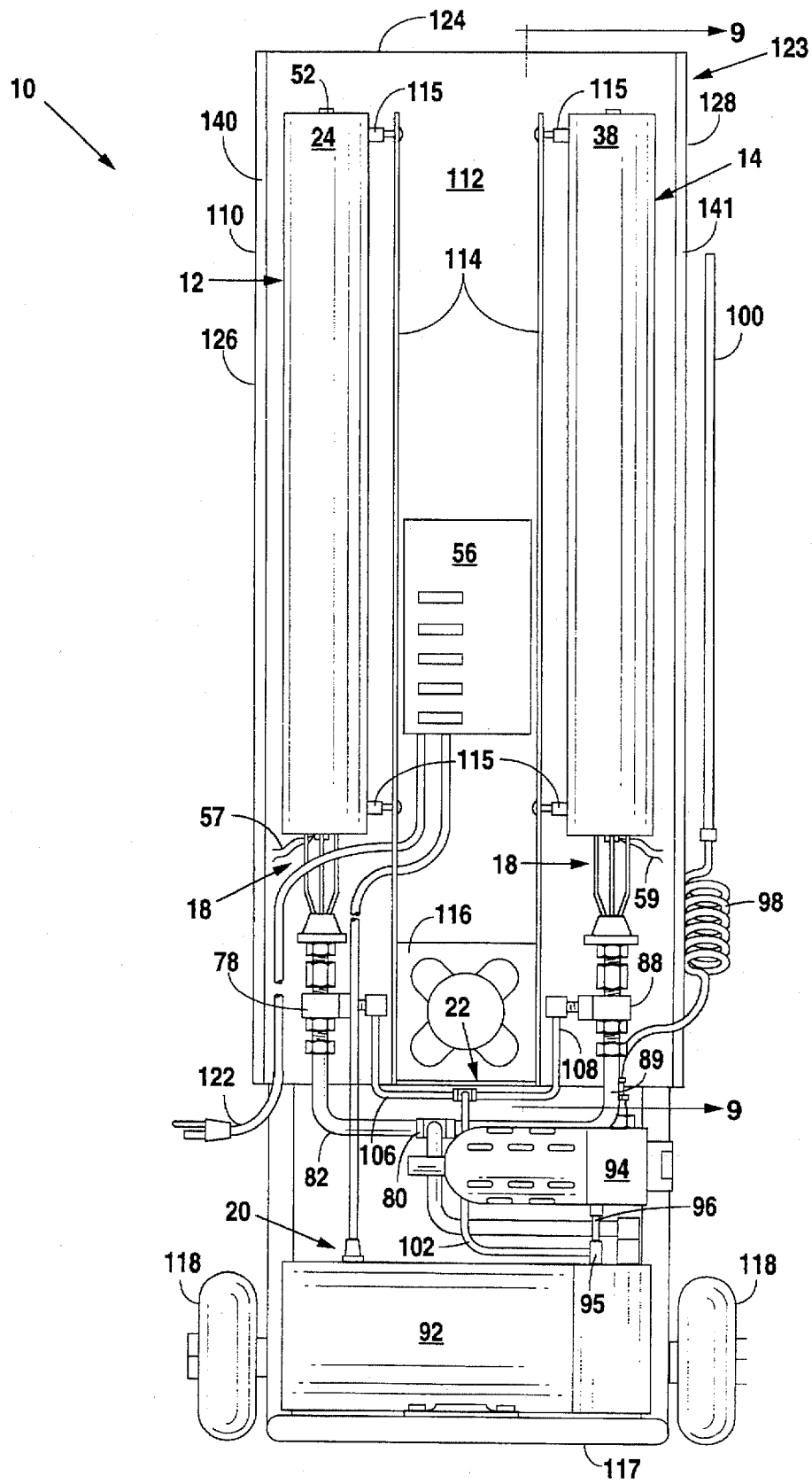
FIG. 1 is an elevation view of the preferred embodiment of the air dryer system of the present invention.
Figure 2:
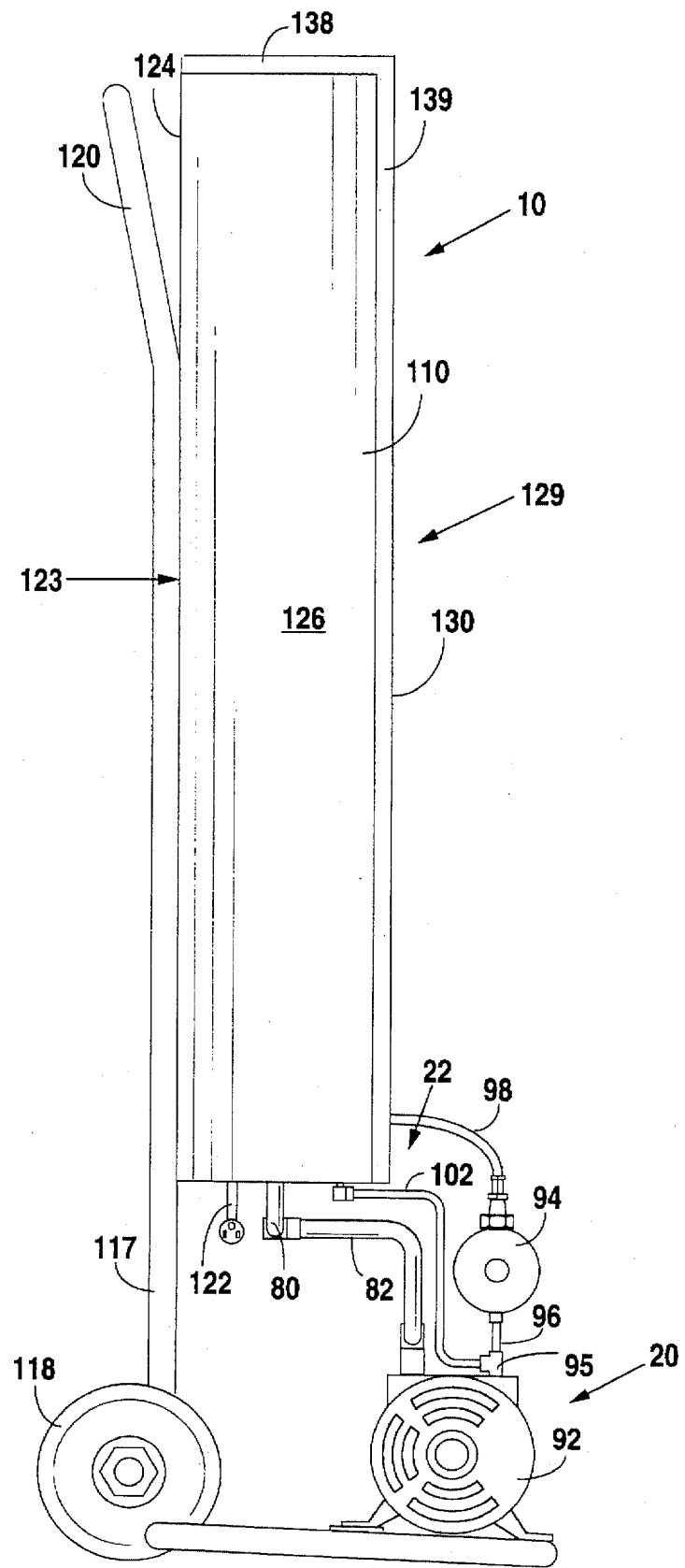
FIG. 2 is a fight side view of the preferred embodiment of the air dryer system of the present invention.
Figure 6:
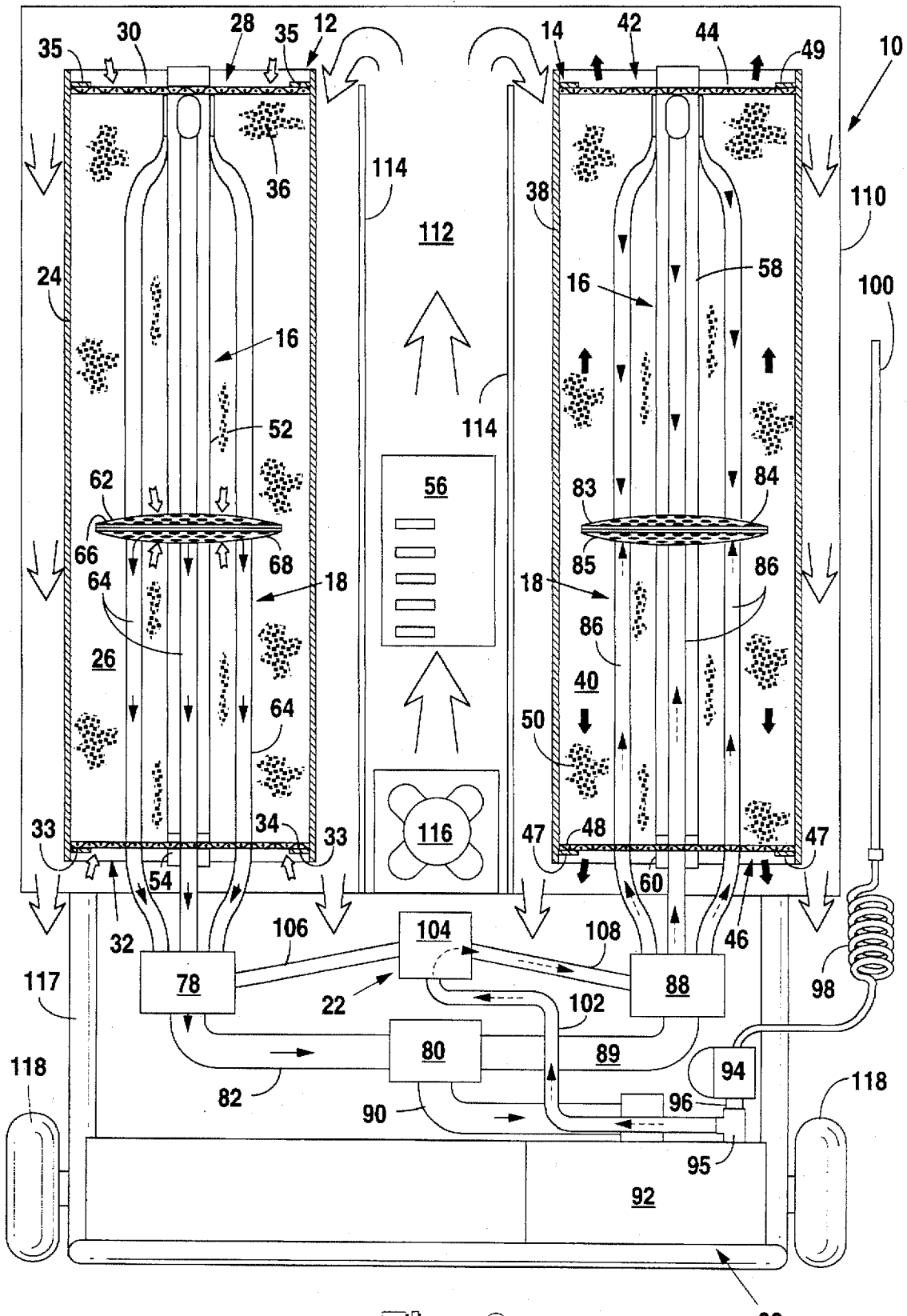
FIG. 6 is an elevational view of the preferred embodiment of the air dryer system of the present invention illustrating the first housing in the DRY mode and the second housing in the PURGE mode.

Referring to FIGS. 1, 2, and 6, the air dryer system of the present invention is identified by the number 10. Air dryer system 10 comprises a pair of housings 12 and 14 having a heater assembly 16 and manifold assembly 18 mounted therein. The manifold assembly 18 is in fluid communication with an air moving assembly 20. The system 10 also preferably comprises a reclamation assembly 22.

Referring again to FIGS. 1, 3 and 6, housing 12 comprises a cylindrical wall 24 having a cavity 26 therein. Housing 12 has an open top 28 which is covered by a top or upper screen 30 and an open bottom 32 which is covered by a bottom or lower screen 34. Screens 30 and 34 have a plurality of holes therethrough which permit fluid communication between the ambient air and cavity 26. Screen 34 is supported within cavity 26 by a lower snap ring 33 which is biased against wall 24 and screen 30 is retained within cavity 26 by an upper snap ring 35 which is also biased against wall 24. A molecular sieve desiccant 36 is contained within cavity 26 and held therein by screens 30 and 34.

Referring again to FIGS. 1 and 6, housing 14 comprises a cylindrical wall 38 having a cavity 40 therein. Housing 14 has an open top 42 which is covered by a top or upper screen 44 and an open bottom 46 which is covered by a bottom or lower screen 48. Screens 44 and 48 have a plurality of holes therethrough which permit fluid communication between the ambient air and cavity 40. Screen 48 is supported within cavity 40 by a lower snap ring 47 which is biased against wall 38 and screen 44 is retained within cavity 40 by an upper snap ring 49 which is also biased against wall 38. A molecular sieve desiccant 50 is contained within cavity 40 and held therein by screens 44 and 48.

Figure 3:
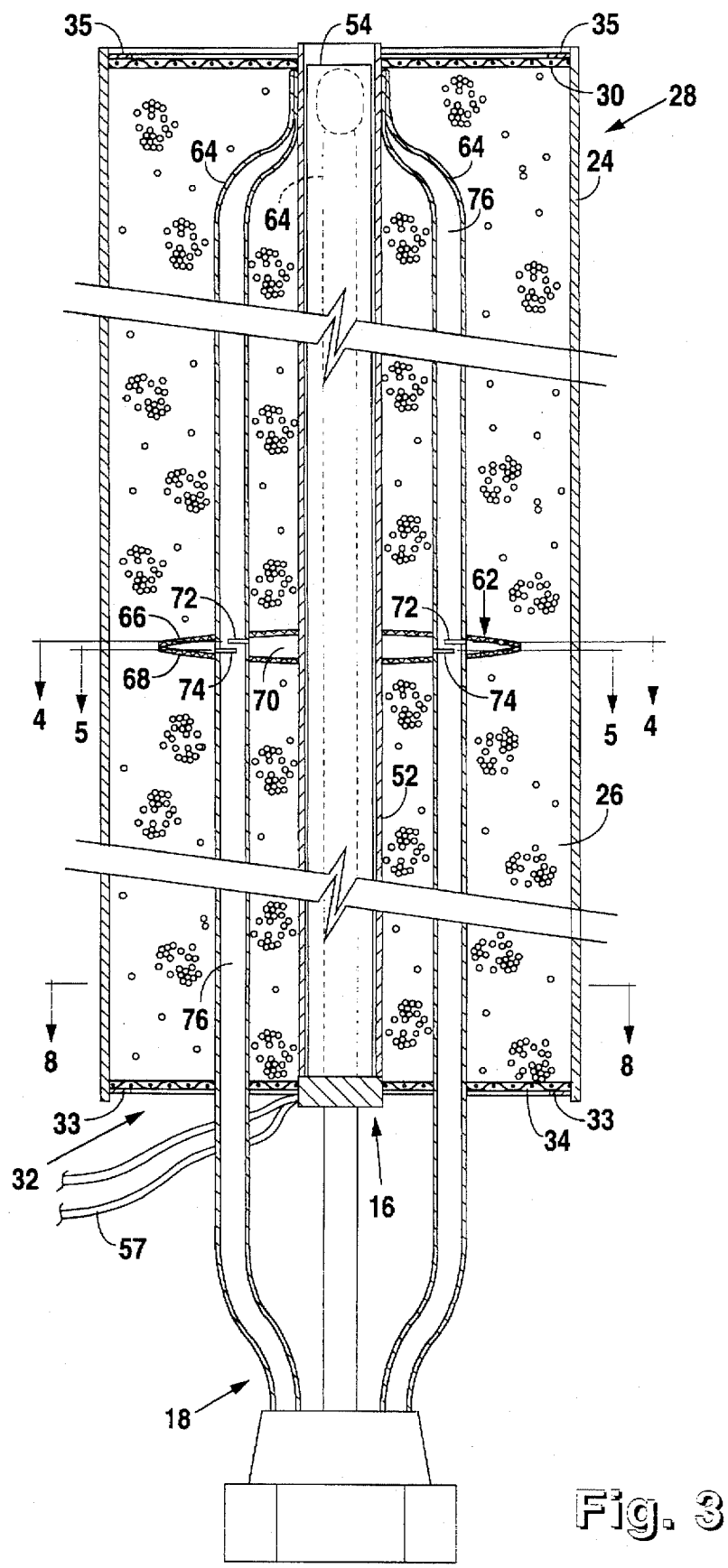
FIG. 3 is a cross sectional view of the manifold assembly and heater assembly in a desiccant housing in the preferred embodiment of the air dryer system of the present invention.
Figure 4:
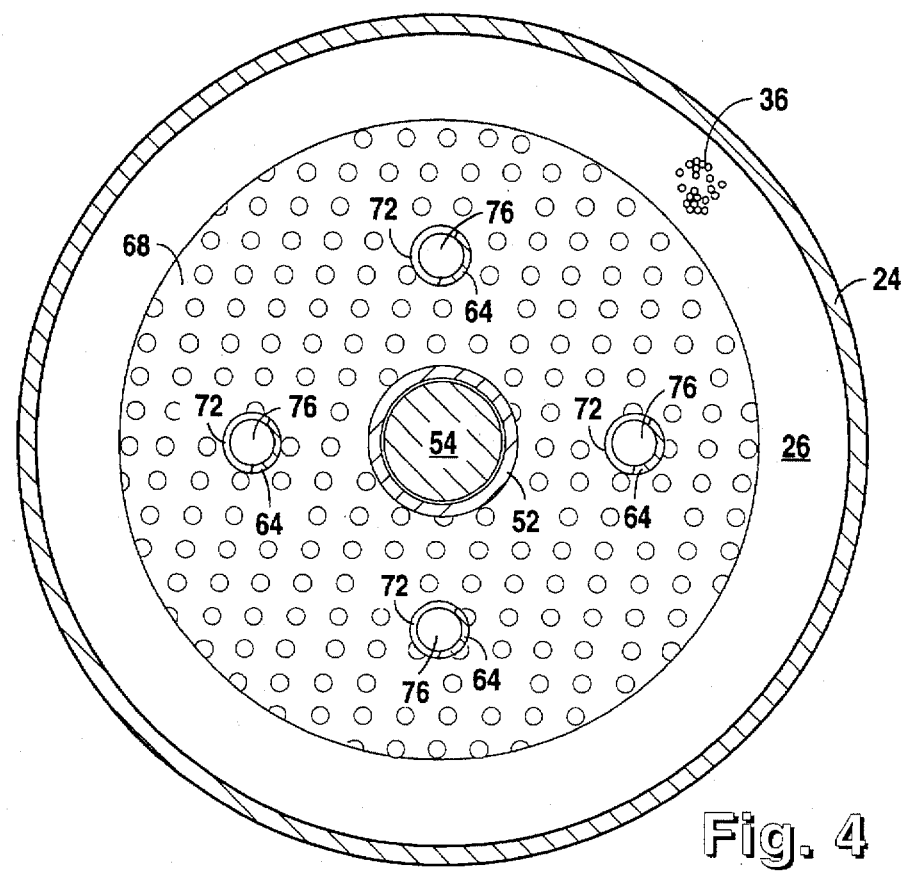
FIG. 4 is a cross sectional view taken along section lines 4—4 of FIG. 3 illustrating the receiver and manifold tubes in the preferred embodiment of the air dryer system of the present invention.
Figure 5:
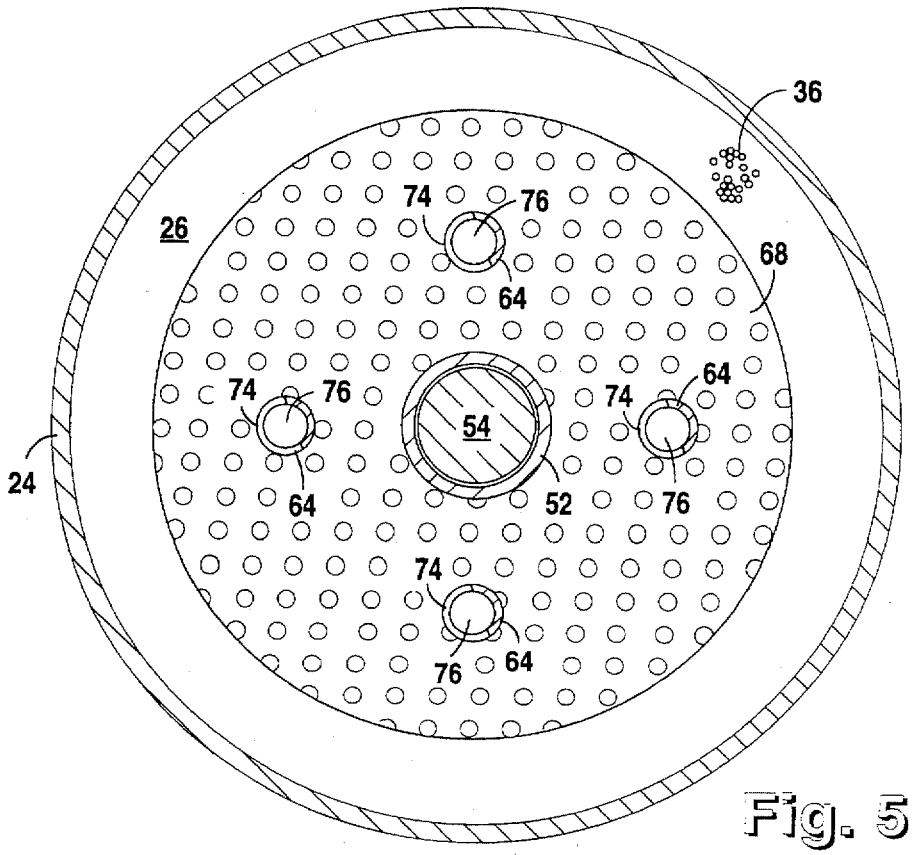
FIG. 5 is a cross sectional view taken along section lines 5—5 of FIG. 3 further illustrating the receiver and manifold tubes in the preferred embodiment of the air dryer system of the present invention.

Referring again to FIGS. 1, 3, 6 and 8, heater assembly 16 comprises a first heater sleeve 52 axially mounted within cavity 26. A heater element 54 is positioned within a passage within sleeve 52 and operatively connected to a programmable controller 56 by wiring 57. Heater assembly 16 further comprises a second heater sleeve 58 axially mounted within cavity 40. A heater element 60 is positioned within a passage within sleeve 58 and operatively connected to controller 56 by wiring 59. Sleeves 52 and 58 are open at the top and bottom thereof to permit ready insertion/removal and cooling of heater elements 54 and 60, respectively. Heater elements 54 and 60 have a circumference of approximately the circumference of sleeves 52 and 58, respectively, and sleeves 52 and 58 are crimped to hold elements 54 and 60, respectively, therein. It is to be understood that although FIG. 3 illustrates the heater assembly 16 and manifold assembly 18 in housing 12, the heater assembly 16 and manifold assembly 18 comprises identical elements within housing 14.

Referring again to FIGS. 1, 3, 4, 6, and 8, the manifold assembly 18 comprises a first receiver 62 mounted within cavity 26 in approximately the center of housing 12 and in fluid communication with a plurality of tubes 64. Tubes 64 are spaced at approximately ninety degrees (90°) relative to each other and approximately halfway between the perimeter of sleeve 52 and the perimeter of receiver 62. Tubes 64 and sleeve 52 extend through and are welded to receiver 62 and lower screen 34. Snap ring 33 thus supports the heating assembly 16 and manifold assembly 18 within housing 12. Sleeve 52 extends through a passage in upper screen 30 and tubes 64 are sealed and welded to the upper end of sleeve 52. Receiver 62 is positioned approximately halfway between top 28 and bottom 32. Receiver 62 comprises an upper screen 66 and a lower screen 68 defining a cavity 70 therebetween. Screens 66 and 68 have a plurality of holes therethrough permitting fluid communication between cavity 26 and cavity 70. Tubes 64 each have a pair of overlapping slits 72 and 74 therein which are positioned within cavity 70 to permit fluid communication between cavity 70 and the passage 76 within each tube 64. Slits 72 and 74 each have an arc of approximately three hundred degrees (300°) and are positioned to provide a substantially uniform suction of air within cavity 70. Tubes 64 are in fluid communication with a first cylinder valve 78 which is in fluid communication with a compressor fitting 80 via a tube 82. Tube 82 is connected to and in fluid communication with valve 78 and fitting 80. Fitting 80 is a T-fitting and valve 78 is a 3-way valve which is operatively connected to controller 56.

Referring again to FIG. 6, manifold assembly 18 further comprises a second receiver 84 mounted within cavity 40 in approximately the center of housing 14 and in fluid communication with a plurality of tubes 86. Tubes 86 are spaced at approximately ninety degrees (90°) relative to each other and approximately halfway between the perimeter of sleeve 58 and the perimeter of receiver 84. Tubes 86 and sleeve 58 extend through and are welded to receiver 84 and lower screen 48. Snap ring 47 thus supports heater assembly 16 and manifold assembly 18 within housing 14. Sleeve 58 extends through a passage in upper screen 44 and tubes 86 are sealed and welded to the upper end of sleeve 58. Receiver 84 is positioned approximately halfway between top 42 and bottom 46. Receiver 84 comprises an upper screen 83 and a lower screen 85 defining a cavity therebetween in the same manner as described in connection with receiver 62. Screens 83 and 85 have a plurality of holes therethrough permitting fluid communication between cavity 40 and the cavity within receiver 84. Tubes 86 each have a pair of overlapping slits therein which are positioned within the cavity of receiver 84 to permit fluid communication between such cavity and the passage within each tube 86 in the same manner as described in connection with housing 12. The slits within tubes 86 each have an arc of approximately three hundred degrees (300°) and are positioned to provide a substantially uniform suction of air within the receiver cavity in the same manner as described in connection with housing 12. Tubes 86 are in fluid communication with a second cylinder valve 88 which is in fluid communication with compressor fitting 80 via a tube 89. Tube 89 is connected to and in fluid communication with valve 88 and fitting 80. Valve 88 is a 3-way valve which is operatively connected to controller 56.

Referring again to FIGS. 1 and 6, fitting 80 is in fluid communication with air moving assembly 20 for drawing air through the manifold assembly 18. The air moving assembly 20 comprises a tube 90 which is connected to and in fluid communication with fitting 80 and a compressor 92. Compressor 92 is connected to and in fluid communication with a filter 94 via a T-fitting 95 and a tube 96. T-fitting 95 is connected to and in fluid communication with compressor 92 and tube 96 is connected to and in fluid communication with T-fitting 95 and filter 94. Compressor 92 is operatively connected to controller 56 and may be a compressor such as described in U.S. Pat. No. 3,311,293, the disclosure of which is hereby incorporated by reference. A flexible hose 98, having a passage therethrough, is connected to and in fluid communication with filter 94 and a wand 100, also having a passage therethrough, for passing dry air from the manifold assembly 18 and air moving assembly 20 outward from the end of the wand 100.

Referring again to FIGS. 1 and 6, the reclamation system 22 comprises a tube 102 which is connected to and in fluid communication with T-fitting 95 and a reclamation T-fitting 104. Fitting 104 is connected to and in fluid communication with first cylinder valve 78 via a tube 106 and to second cylinder valve 88 via a tube 108. Tube 106 is connected to and in fluid communication with fitting 104 and valve 78 and tube 108 is connected to and in fluid communication with fitting 104 and valve 88.

Referring again to FIGS. 1, 2, and 6, the system 10 preferably comprises a portable case 110 having a cavity 112 therein divided by a pair of baffles 114. Bolts or brackets 115 may be utilized to connect housings 12 and 14 to the baffle 114 adjacent thereto. Controller 56 and a ventilation fan 116 are preferably mounted to and within the case 110. Fan 116 is preferably a one hundred cubic feet per minute (100 cfm) axial fan which is operatively connected to controller 56. Fan 116 is preferably mounted adjacent to and below controller 56 to permit cooling of controller 56 during operation of fan 116. Case 110 and compressor 92 are preferably connected to a supporting dolly or frame 117 having a pair of wheels 118 and a handle 120 for readily moving or transporting the system 10 to various locations. A power cord 122 connected to controller 56 is used to access an appropriate power supply (not shown).

Referring to FIGS. 1, 2 and 9, the case 110 comprises an integral case body 123 having a rear panel 124, a left side panel 126, and a right side panel 128. Case 110 further comprises an integral case cover 129 having a front panel 130 and a top panel 132 for sealing the top of the case 110. The case body 123 further comprises, as an integral part thereof or bolted thereto, a bottom panel 134 which extends between baffles 114, rear panel 124 and front panel 130 for sealing the mid portion of the bottom of case 110. Case 110 is open on the left and right side of panel 134 below housings 12 and 14, respectively. Baffles 114 are welded or otherwise connected to rear panel 124 and extend to front panel 130 such that rear panel 124, front panel 130, baffles 114 and bottom panel 134 define an enclosed trough for directing ambient air to the top of case 110 over the top of baffles 114 as hereinafter described. Rear panel 124 has a passage 136 therein within which fan 116 is mounted to panel 124 for drawing ambient air into the cavity 112. As illustrated in FIG. 1, FIG. 2 and FIG. 9, case cover 129 has a lip 138 substantially perpendicular to top panel 132 and a lip 139 substantially perpendicular to, and on each side of, front panel 130 for sealing engagement with case body 123. Further, case cover 129 may be removably connected to case body 123 by securing screws (not shown) through front panel 130 into the lips 140 and 141 on the front of case body 123. Lip 140 is substantially perpendicular to left side panel 126 and lip 141 is substantially perpendicular to right side panel 128. It is also to be understood that for purposes of clarity, panels 130, 132, and 134 are not shown in FIG. 1.

Referring to FIG. 6, the operation of the air dryer system 10 of the present invention will be described in greater detail. When power is ON and housing 12 begins in the DRY mode, valve 78 and heater element 60 are energized and fan 116 blows ambient air, illustrated by the clear arrows, across controller 56. Compressor 92 is also energized so as to draw a suction through valve 78. Ambient air (clear arrows) is thereby drawn into housing 12 through ends 28 and 32 and through desiccant 36 in housing 12. The air dried by desiccant 36, illustrated by the black arrows, is drawn from approximately the center of housing 12 through receiver 62 and tubes 64 via slits 72 and 74. Dried air passes through tubes 64, valve 78, tube 82, fitting 80 and tube 90 into compressor 92. Most of the dry air thereafter passes through T-fitting 95, tube 96, filter 94, and hose 98 and outward through wand 100 to a desired location or environment.

When housing 12 is in the DRY mode described hereinabove, housing 14 is in the PURGE mode. When the heater element 60 is energized, moisture in the desiccant 50 within housing 14 is converted to warm, humid air, illustrated by the shaded arrows. The ambient air blown by fan 116 facilitates the purging of the water vapor or water laden air (shaded arrows) from case 110 by carrying or blowing the water vapor away from housing 14 and out from the bottom of case 110.

It is to be understood that the drying of desiccant 50 within housing 14 is facilitated by the reclamation system 22 whereby a portion of the dry air, illustrated in dashed arrows, passes from compressor 92 and T-fitting 95 through tube 102, fitting 104, tube 108, valve 88 and tubes 86. The dry reclaimed air (dashed arrows) passes through the slits in tubes 86 and receiver 84 into the desiccant 50 to further facilitate the drying thereof and the removal of water vapor from housing 14. Some of the dry reclaimed air also enters the upper portion of tubes 86 and, during heating of the housing 14, such dry reclaimed air in the top end of tubes 86 is heated and expands into receiver 84, thereby raising the pressure of such air and facilitating the purging of water vapor from housing 14. Further, as the housing 14 cools, the pressure of reclaimed air within tubes 86 decreases, thereby drawing cool reclaimed air into the tubes 86 and further facilitating the cooling of housing 14.

Figure 7:
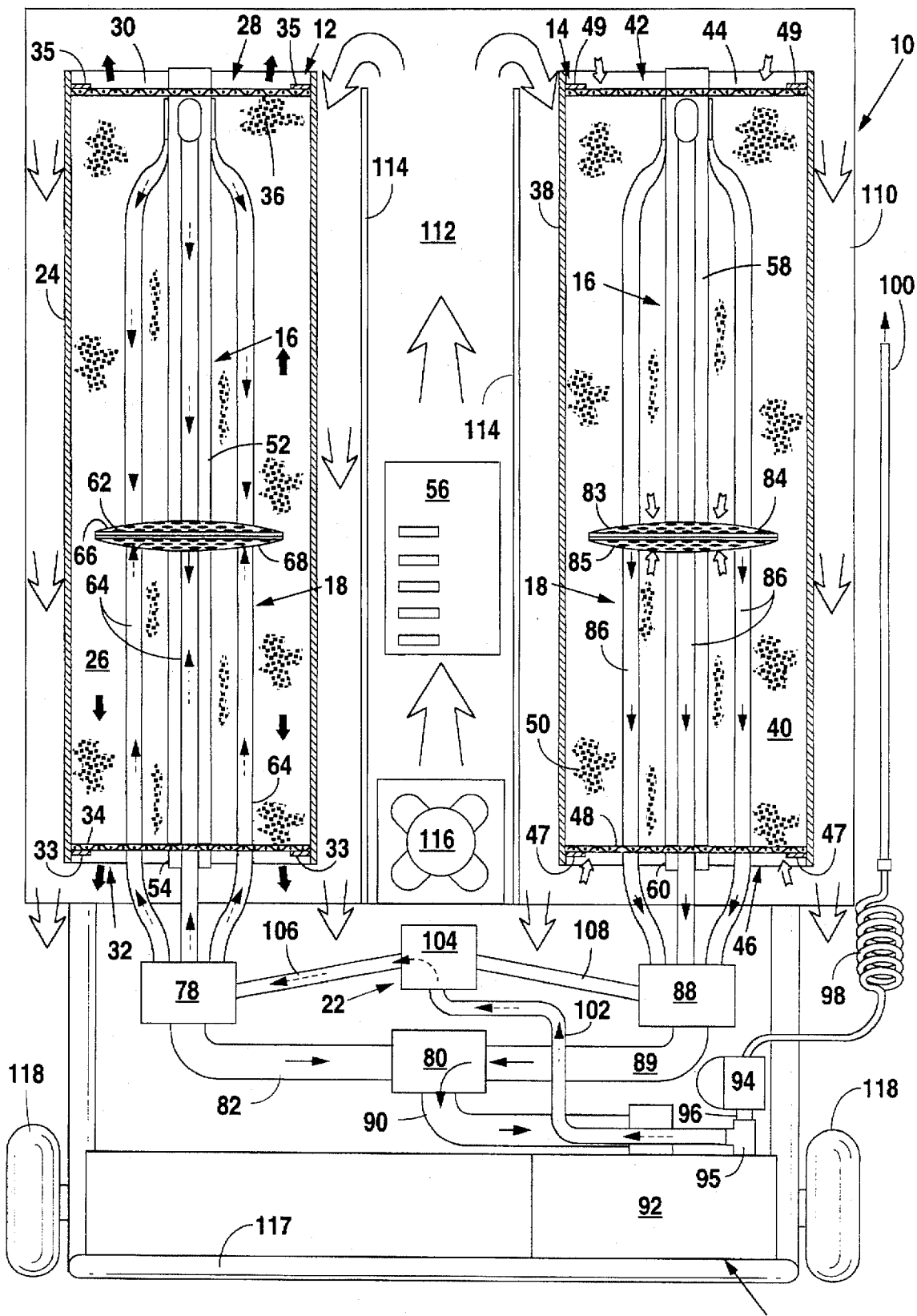
FIG. 7 is an elevational view of the preferred embodiment of the air dryer system of the present invention illustrating the first housing in the PURGE mode and the second housing in the DRY mode.
Figure 8:
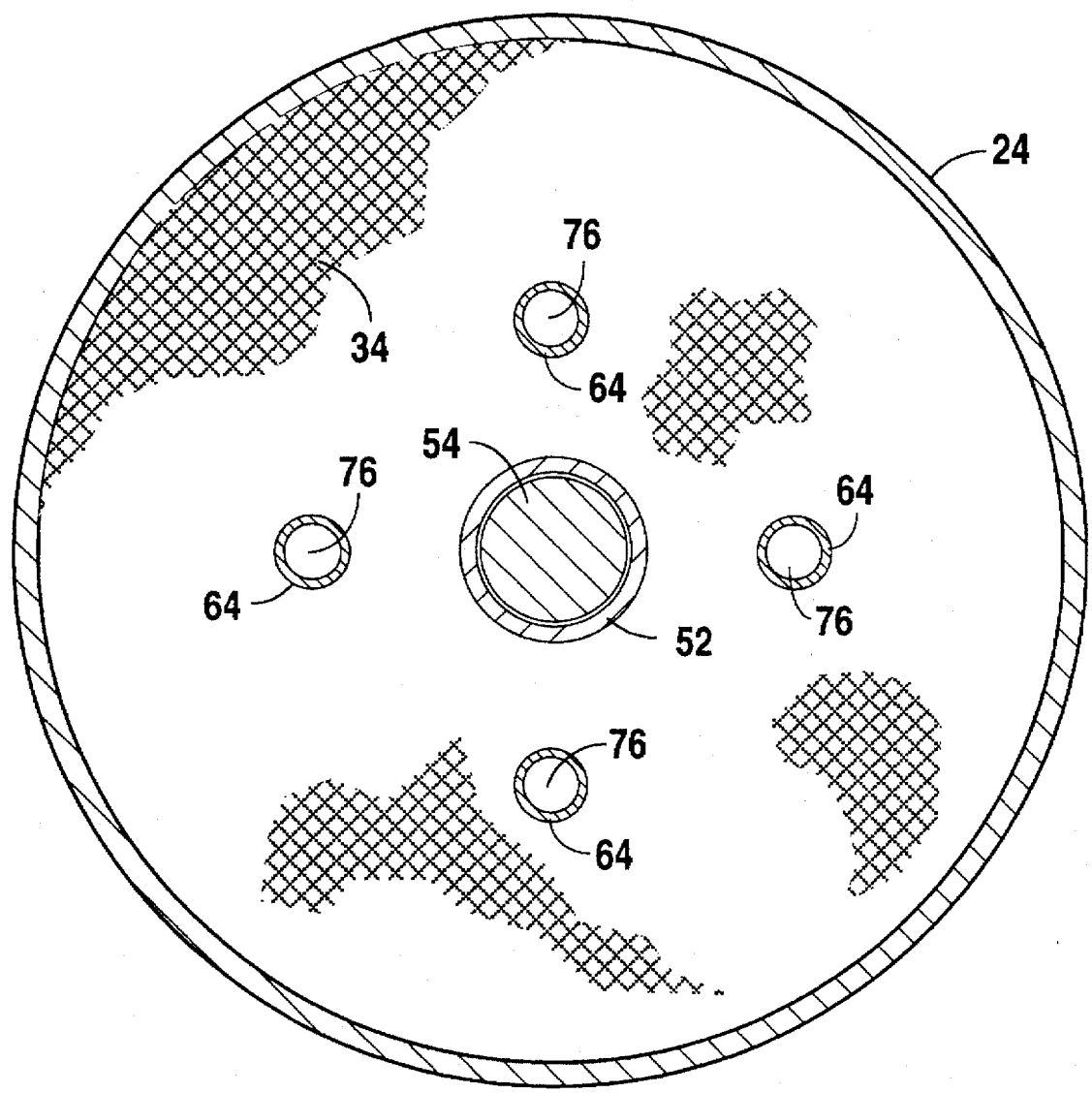
FIG. 8 is a cross sectional view taken along section lines 8—8 of FIG. 3 illustrating the manifold assembly and heater assembly in the preferred embodiment of the air dryer system of the present invention.

After a predetermined time interval (approximately two hours), heater element 60 is deenergized while valve 78 remains energized and dry reclaimed air continues to flow into housing 14 to force cool desiccant 50. After a further predetermined time interval (approximately one hour), valve 78 is deenergized and valve 88 and heater element 54 are energized, thereby converting housing 14 to the DRY mode and housing 12 to the PURGE mode, as illustrated in FIG. 7. The cycle and flow of air is thus reversed. Ambient air (clear arrows) is thereby drawn into housing 14 through ends 42 and 46 and through desiccant 50 in housing 14. The air dried by desiccant 50, illustrated by the black arrows, is drawn through receiver 84 and tubes 86 via the slits in tubes 86. Dried air passes through tubes 86, valve 88, tube 89, fitting 80 and tube 90 into compressor 92. Most of the dry air thereafter passes through T-fitting 95, tube 96, filter 94, and hose 98 and outward through wand 100 to a desired location or environment.

When housing 14 is in the DRY mode described hereinabove, housing 12 is in the PURGE mode. When the heater element 54 is energized, moisture in the desiccant 36 within housing 12 is converted to warm, humid air, illustrated by the shaded arrows. The ambient air blown by fan 116 facilitates the purging of the water vapor or water laden air (shaded arrows) from case 110 by carrying or blowing the water vapor away from housing 12 and out from the bottom of case 110.

Once again, it is to be understood that the drying of desiccant 36 within housing 12 is facilitated by the reclamation system 22 whereby a portion of the dry air, illustrated in dashed arrows, passes from compressor 92 and T-fitting 95 through tube 102, fitting 104, tube 106, valve 78 and tubes 64, as further illustrated in FIG. 7. The dry reclaimed air (dashed arrows) passes through the tube slits 72 and 74 and receiver 62 into the desiccant 36 to further facilitate the drying thereof and the removal of water vapor from housing 12. Some of the dry reclaimed air also enters the upper portion of tubes 64 and, during heating of the housing 12, such dry reclaimed air in the top end of tubes 64 is heated and expands into receiver 62, thereby raising the pressure of such air and facilitating the purging of water vapor from housing 12. Further, as the housing 12 cools, the pressure of reclaimed air within tubes 64 decreases, thereby drawing cool reclaimed air into the tubes 64 and further facilitating the cooling of housing 12.

After a predetermined time interval (approximately two hours), heater element 54 is deenergized while valve 88 remains energized and dry reclaimed air continues to flow into housing 12 to force cool desiccant 36. After a further predetermined time interval (approximately one hour), valve 88 is deenergized and valve 78 and heater element 60 are reenergized, thereby converting housing 12 to the DRY mode and housing 14 to the PURGE mode, as illustrated in FIG. 6. The cycle and flow of air is thus reversed and the alternate cycling between DRY and PURGE modes is repeated by housings 12 and 14 so that a continuous source of dry air is provided from the end of wand 100 when the system 10 is ON.

The operation of the air dryer system 10 can be summarized as follows. Each complete cycle of the system 10 goes through four (4) phases. When housing 12 is in the DRY mode and housing 14 is in the PURGE mode as described above, the system 10 enters Phase I wherein the solenoid associated with valve 78 is ON, the solenoid associated with valve 88 is OFF, heater element 60 is ON, and heater element 54 is OFF. Phase I preferably lasts a predetermined time interval of approximately two hours. In Phase II, the valve 78 solenoid remains ON, the valve 88 solenoid remains OFF, heater element 60 is OFF, and heater element 54 remains OFF. Phase II preferably lasts a predetermined time interval of approximately one hour. Reclamation air continues to flow through valve 88 into housing 14 throughout Phases I and II. The system 10 thereafter enters the alternate mode in which housing 12 is in the PURGE mode and housing 14 is in the DRY mode. The system 10 enters Phase III wherein the solenoid associated with valve 88 is ON, the solenoid associated with valve 78 is OFF, heater element 54 is ON, and heater element 60 remains OFF. Phase III preferably two hours. In predetermined time interval of approximately two hours. In Phase IV, the valve 88 solenoid remains ON, the valve 78 solenoid remains OFF, heater element 54 is OFF, and heater element 60 remains OFF. Reclamation air continues to flow through valve 78 into housing 12 throughout Phases III and IV. Each DRY or PURGE mode preferably lasts approximately three hours such that a complete cycle of the system 10 in its normal operation mode lasts approximately six hours.

It is to be understood that controller 56 preferably stores the Phase and Phase time data in non-volatile memory at one minute intervals of normal operation, thereby enabling the controller 56 to restart the system 10 at the last point before an intermittent power failure or glitch. Further, upon start-up of the system 10, controller 56 preferably starts in the last Phase and Phase time prior to shut down, as determined by its internal non-volatile memory.

It is also to be understood that the controller 56 may be provided with a Test mode wherein depression of the Test mode button causes the controller to cycle through all four (4) Phases when the button is pressed. In the Test mode the timer speeds up such that six seconds is the equivalent of sixty minutes. When the button is released, the controller 56 resets to the start of Phase I. The controller 56 can also be set to a particular Phase by pressing the Test button until it cycles to the desired Phase and shutting the system 10 OFF. When the system 10 is restarted it will be in the desired Phase.

It is to be understood that controller 56 may be a conventional industrial programmable controller. Likewise, controller 56 may be operated by a number of suitable microprocessors known to those of ordinary skill in the art. Further, the commands generated by such microprocessor preferably drive individual solid state switches in series with the heaters and solenoids, causing them to turn ON and OFF as described hereinabove or otherwise desired.

It is to be understood that the system 10 is able to remove approximately ninety-nine percent (99%) or more of the water vapor from the ambient air so as to provide dry air with a substantially low dewpoint in the range of approximately −40° F. or lower. The system 10 of the present invention is thus able to dry air to dryness levels consistent with prior regenerative desiccant dryers without the inherent deficiencies associated therewith.

It is to be understood that any type of apparatus for moving air or otherwise drawing a suction on manifold assembly 18 may be utilized in place of air moving assembly 20. Further, the system 10 of the present invention may be utilized wherever a continuous point source of dry air is required or desired. Applications include process air for ozone generators, corrosion protection, dehumidification, moisture regain control, drying, painting, powder coating, silk screening, and instrument environmental control. It is also to be understood that housings 12 and 14 are substantially filled with desiccant 36 and 50, respectively, prior to operation of the system 10.

While the air dryer system of the present invention has been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

I claim:

1. A process for drying air, comprising the steps of:
   (a) drawing dry air from approximately the center of a first desiccant portion, comprising the step of drawing air through each open end of a first housing and along a length of said first housing through said first desiccant portion within said first housing;
   (b) simultaneously purging a second desiccant portion;
   (c) drawing dry air from approximately the center of said second desiccant portion, comprising the step of drawing air through each open end of a second housing and along a length of said second housing through said second desiccant portion within said second housing;
   (d) simultaneously purging said first desiccant portion; and
   (e) repeating steps (a) through (d).

2. A process for drying air, as recited in claim 1, wherein purging step (b) comprises the step of heating said second desiccant portion and purging step (d) comprises the step of heating said first desiccant portion.

3. A process for drying air, as recited in claim 2, wherein step (a) comprises a first predetermined time interval and said step of heating said second desiccant portion comprises a second predetermined time interval which is shorter than said first predetermined time interval.

4. A process for drying air, as recited in claim 1, further comprising the step of directing a portion of said dry air from said first desiccant portion into said second desiccant portion while said second desiccant portion is being purged and directing a portion of said dry air from said second desiccant portion into said first desiccant portion while said first desiccant portion is being purged.

5. An air dryer system, comprising:
   a first housing for receiving a first desiccant portion, said first housing having a first open end and a second open end and a length from said first open end to said second open end;
   a second housing for receiving a second desiccant portion, said second housing having a first open end and a second open end and a length from said first open end to said second open end;
   means for drawing dry air from said desiccant portions comprising a manifold assembly having a first receiver located intermediate said first end and said second end of said first housing for drawing air through each end of said first housing and along said length of said first housing, and second receiver located intermediate said first end and said second end of said second housing for drawing air through each end of said second housing and along said length of said second housing;

means for purging said desiccant portions; and means for alternating the flow of air through said first desiccant portion while purging said second desiccant portion and through said second desiccant portion while purging said first desiccant portion.

6. An air dryer system, as recited in claim 5, wherein said means for purging said desiccant portions comprises means for heating said desiccant portions.

7. An air dryer system, as recited in claim 6, wherein said means for heating said desiccant portions comprises a heating element extending axially through approximately the center of each of said desiccant portions.

8. An air dryer system, as recited in claim 5, wherein said first and second ends of said desiccant housings are open across substantially the entire width of said housings.

9. An air dryer system, as recited in claim 8, further comprising a fan for providing ambient air to said housings and carrying water vapor away from said housings.

10. An air dryer system, as recited in claim 5, wherein said manifold assembly comprises a plurality of tubes, each of said tubes having a pair of slits therein for drawing air into said manifold assembly.

11. An air dryer system, as recited in claim 5, wherein said manifold assembly comprises at least four tubes spaced at approximately ninety degrees relative to each other.

12. An air dryer system, as recited in claim 5, wherein said means for drawing dry air comprises an air moving assembly including a compressor in fluid communication with said manifold assembly for drawing a suction through said manifold assembly.

13. An air dryer system, as recited in claim 5, further comprising a reclamation assembly for directing a portion of said dry air into said desiccant being purged.

14. An air dryer system, comprising:

first and second desiccant portions;

means for drawing air from approximately the center of said desiccant portions comprising a manifold assembly having a receiver, said manifold assembly comprising a plurality of tubes, each of said tubes having a pair of slits therein in fluid communication with a cavity within said receiver wherein each pair of said slits overlap and each of said slits has an arc of approximately three hundred degrees;

means for purging said desiccant portions; and means for alternating the flow of ambient air through said first desiccant portion while purging said second desiccant portion and through said second desiccant portion while purging said first desiccant portion.

15. An air dryer system, comprising:

first and second desiccant housings, said first desiccant housing having a first open end and a second open end and a length from said first open end to said second open end, said second desiccant housing having a first open end and a second open end and a length from said first open end to said second open end;

means for drawing dry air from approximately the center of said housings comprising a manifold assembly having a first receiver in approximately the center of said first housing and a second receiver in approximately the center of said second housing, said manifold assembly comprising a plurality of tubes, each of said tubes having a pair of slits therein, said manifold assembly drawing air through each end of said first housing and along said length of said first housing toward approximately said center of said first housing and through each end of said second housing and along said length of said second housing toward approximately said center of said second housing;

means for heating said housings comprising a heater element mounted within a sleeve within each of said housings;

means for reclaiming a portion of said dry air from said first housing and directing said dry air portion into said second housing; and means for alternating the flow of ambient air through said first housing while purging said second housing and through said second housing while purging said first housing.

16. An air dryer system, as recited in claim 15, wherein said manifold assembly comprises at least four tubes spaced at approximately ninety degrees relative to each other.

17. An air dryer system, as recited in claim 15, wherein said means for drawing dry air comprises an air moving assembly including a compressor in fluid communication with said manifold assembly for drawing a suction through said manifold assembly.

18. An air dryer system, as recited in claim 15, wherein said system comprises a portable case for transporting said system to various locations, said case having a pair of baffles therein.

19. An air dryer system, as recited in claim 15, further comprising a wand connected to said dry air drawing means for delivering said dry air to a desired location.

20. An air dryer system, comprising:

first and second desiccant housings;

means for drawing dry air through approximately the center of said housings comprising a manifold assembly having a receiver in approximately the center of said housings, said manifold assembly comprising a plurality of tubes, each of said tubes having a pair of slits therein wherein each pair of said slits overlap and each of said slits has an arc of approximately three hundred degrees;

means for heating said housings comprising a heater element mounted within a sleeve within each of said housings;

means for reclaiming a portion of said dry air from said first housing and directing said dry air portion into said second housing; and means for alternating the flow of ambient air through said first housing while purging said second housing and through said second housing while purging said first housing.

* * * * *